Oct. 30, 1962 H. C. POLLITZ Re. 25,275

SURFACING MACHINE CONTROL MEANS

Original Filed Feb. 8, 1956 3 Sheets-Sheet 1

INVENTOR.
Harold C. Pollitz
BY Brown, Jackson, Boettcher & Dinner.
Attys.

Oct. 30, 1962 H. C. POLLITZ Re. 25,275

SURFACING MACHINE CONTROL MEANS

Original Filed Feb. 8, 1956 3 Sheets-Sheet 2

INVENTOR.
Harold C. Pollitz,
BY Brown, Jackson, Boettcher & Dienner.
Attys.

SURFACING MACHINE CONTROL MEANS

Original Filed Feb. 8, 1956 3 Sheets-Sheet 3

INVENTOR.
Harold C. Pollitz,
BY Brown, Jackson, Boettcher & Dienner,
Attys.

United States Patent Office

Re. 25,275
Reissued Oct. 30, 1962

25,275

SURFACING MACHINE CONTROL MEANS

Harold C. Pollitz, Cedar Rapids, Iowa, assignor to Iowa Manufacturing Company of Cedar Rapids, Iowa, Cedar Rapids, Iowa, a corporation of Iowa Original No. 2,911,892, dated Nov. 10, 1959, Ser. No. 564,186, Feb. 8, 1956. Application for reissue Jan. 2, 1962, Ser. No. 163,944

6 Claims. (Cl. 94—46)

Matter enclosed in heavy brackets [ ] appears in the original patent but forms no part of this reissue specification; matter printed in italics indicates the additions made by reissue.

This invention relates to means for controlling the delivery and distribution of materials in general and, in certain of its aspects, has to do particularly with the delivery and distribution of materials in road surfacing operations.

Road surfacing machines in which the surfacing or paving material, which may be a mix of bitumen and an aggregate, for example, is spread and compacted in suitable widths or slabs upon the roadway or bed during advance of the machine therealong are well known and extensively used. In some of such machines the mix or surfacing material is dumped from trucks into a hopper from which it is delivered by a conveyor, constituting the bottom of the hopper, to a spreading screw by which it is spread across the roadway to the desired width of the strip or slab being laid. The width of roadways may vary greatly and it is important that the width of the slab be such as to assure maximum speed and economy in the surfacing operation. Accordingly, the most efficient width of the slab in any given case may be substantially different from that in another case. It becomes important, therefore, that the width of the slab being laid in a given case be uniform and accurately maintained. In the known machines, it frequently happens, due to the consistency of the mix or other causes, that the material is delivered by the delivery conveyor in excess of that which can be efficiently spread to the desired width by the distributing conveyor or spreading screw. In such cases the material may be spread to a greater width than desired, or may even be spread outward beyond the effective area of the compacting and finishing means of the machine, both of which are objectionable.

My invention is directed to means for avoiding the above noted objections to the presently known road paving or surfacing machines above mentioned. To that end I provide control means whereby accumulation of excess material adjacent either or one end of the distributing conveyor or screw interrupts delivery of material thereto until the excess material has been compensated for to sufficient extent to assure that the slab being laid will be maintained at the desired width. Preferably the distributing conveyor or screw is formed in two independently operable sections and means is provided whereby either section may be enabled or disabled selectively. If excess material piles up at one section operation of that section may be stopped until the excess material has been compensated for by material laid at that section in the continued advance of the machine, while the other section remains in operation. While the control means of my invention is particularly applicable, in certain of its aspects, to paving or road surfacing machines, and is shown and described as used in that connection by way of example, in its broader aspects it is applicable to various other material handling machines, as above indicated. Further objects and advantages of my invention will appear from the detail description.

Figure 1:
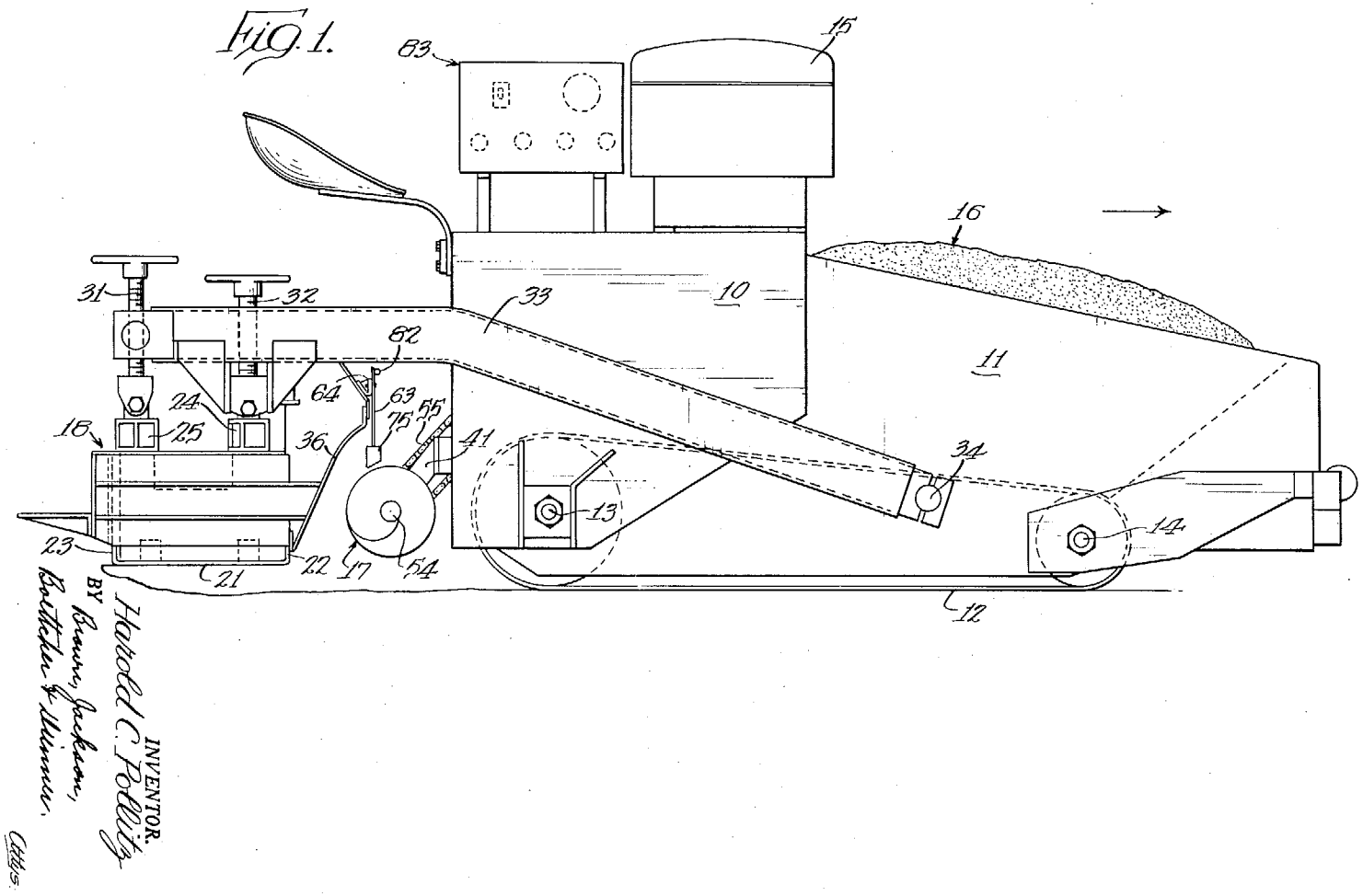
FIGURE 1 is a side view of a road surfacing machine embodying the control means of my invention.
Figure 3:
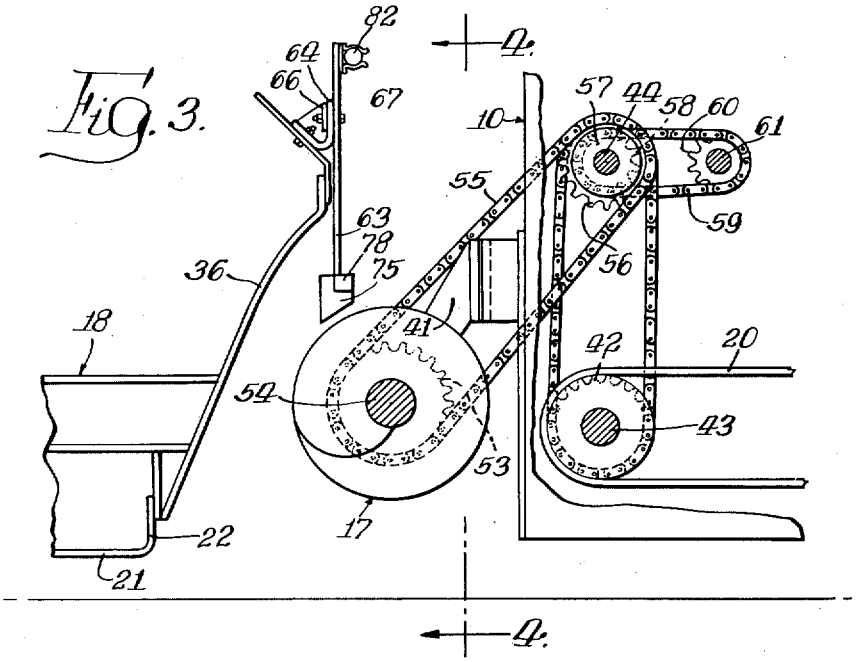
FIGURE 3 is a semidiagrammatic side view of the tractor and hopper unit and the screed unit, showing the drive for the material delivery conveyor and the material distributing screw conveyor, and also showing control means embodying my invention.

I have shown the control means of my invention as applied, by way of example, to a surfacing machine similar to that disclosed in my copending application for Vibrating Finishing Machine, Serial No. 331,041, filed January 13, 1953, now Patent No. 2,757,588. Referring to FIGURE 1, the machine includes a tractor-hopper unit comprising the tractor unit 10 and a hopper 11, both mounted upon a track laying carriage 12 extending between axles 13 and 14 so that the entire unit may be self-propelled along the road, as by means of an internal combustion engine 15, or other suitable prime mover. The hopper 11 is adapted to be filled periodically with a suitable surfacing material, indicated at 16, such as a mix of a bituminous binder and an aggregate, for example. The bottom of the hopper 11 is closed by an endless slat conveyor 20 (FIGURE 3) of suitable known type, the upper run of which travels rearwardly during advance of the machine in the direction indicated by the arrow in FIGURE 1, and delivers the material to a transversely extending screw conveyor 17 which spreads the material laterally of the machine to the desired width of the strip or slab of paving being laid. *The conveyor 20 is of suitable known type, as stated, and comprises two independently driven sections. Such conveyors are well known and are shown, for example, in the Barber patent, No. 2,351,-592 and in the Horning patents, Nos. 2,589,256 and 2,589,257.* The distributing screw conveyor 17 is disposed in front of a screed assembly 18 comprising a flat sheet metal plate 21 of appropriate extent transversely of the machine to cover the strip or slab of surfacing material being laid. The plate 21 is provided with vertical front and rear flanges 22 and 23, respectively, and the screed assembly 18 has secured thereto transverse beams 24 and 25 to which are secured the lower ends of adjusting screws 31 and 32 mounted on the rearward portions of two side arms, one of which is shown at 33, pivoted at their forward ends, at 34, to the tractor-hopper unit. The screed plate 21 may be heated in a suitable known manner and may also be vibrated in a suitable known manner, for compacting the surfacing or paving material and finishing the upper surface thereof during continued advance of the machine. A suitably mounted mold board 36 is disposed in front of the screed assembly 18, a short distance in rear of the distributing or spreading screw conveyor 17, for directing the spread material downwardly and rearwardly to the screed plate 21. The machine so far described is by way of example only and it will be understood that the control means of my invention may be applied to that machine or to any machine to which it is adaptable.

Figure 2:
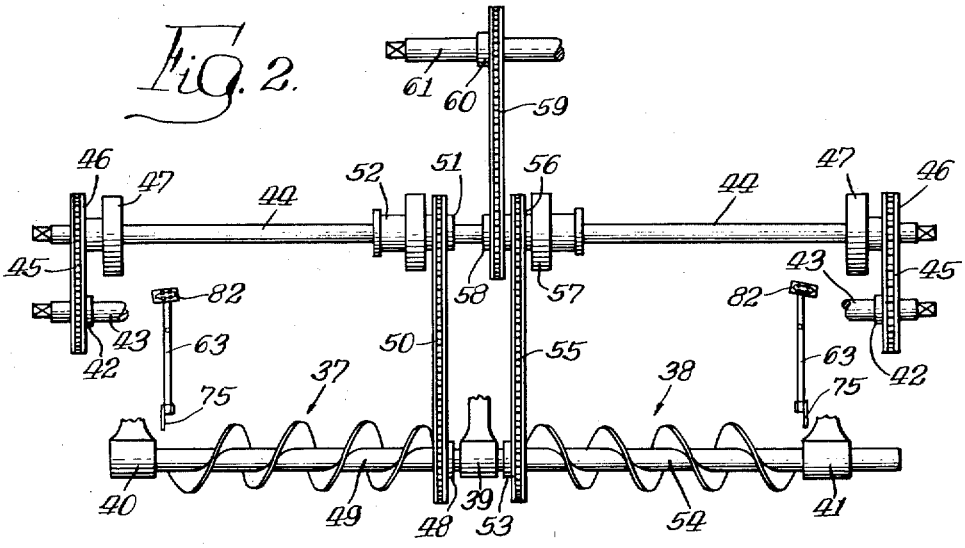
FIGURE 2 is a diagrammatic plan view of the parts for driving the surfacing material delivery conveyor and the material distributing screw conveyor.

Referring to FIGURE 2, the screw conveyor 17 is formed in two sections 37 and 38 rotatably mounted at their inner ends in a bearing bracket 39 secured to the tractor unit 10. The sections 37 and 38 are rotatably mounted adjacent their outer ends in bearing brackets 40 and 41 secured to the tractor unit 10. [The] *Each section of the* delivery conveyor 20 includes side chains which pass about sprocket wheels, one of which is shown at 42, secured on a conveyor drive shaft 43 rotatably mounted on the tractor unit 10, it being understood that the forward end *of each section* of conveyor 20 passes about sprocket wheels carried by a forward shaft. [Shaft] *Each shaft* 43 is driven by a countershaft 44, through a sprocket and chain drive 45 including a sprocket wheel 46 on shaft 44 and an associated clutch 47, to be described more fully later, by means of which sprocket wheel 46 may be clutched and de-clutched to and from the countershaft 44. A sprocket wheel 48 is secured on shaft 49 of worm section 37 adjacent the inner end thereof. A chain 50 passes about sprocket wheel 48 and about a sprocket wheel 51 mounted on countershaft 44. The sprocket wheel 51 has associated therewith a clutch 52, which may be of any suitable conventional type and need not be described in detail, by means of which sprocket wheel 51 may be clutched to and declutched from the countershaft 44. A sprocket wheel 53 is secured on the inner end of shaft 54 of worm section 38 and has driving connection, by means of chain 55, to a sprocket wheel 56 mounted on countershaft 44 and having associated therewith a clutch 57 similar to clutch 52 for clutching and de-clutching sprocket wheel 56 to and from the countershaft 44. A third sprocket wheel 58 is fixed on countershaft 44 and has driving connection, by means of a chain 59, to a sprocket wheel 60 secured on a drive shaft 61. The shafts 43, 44 and 61 are rotatably mounted on the tractor unit 10 in a suitable known manner and extend transversely thereof, as will be understood from what has been said. Shaft 61 is driven in proper direction and at appropriate speed in a suitable manner, conveniently by the prime mover 15 which, as noted, may be an internal combustion engine. It will be seen, from what has been said, that the sections 37 and 38 of the distributing or spreading screw conveyor 17 are independently operable and either thereof may be driven independently of the other as conditions may require. *Likewise, the sections of the delivery conveyor 20 are independently operable and either thereof may be driven independently of the other, as conditions may require, as will be understood.*

The width of the strip or slab of surfacing material being laid is determined by sensing means disposed adjacent each end of the distributing or spreading screw conveyor 17. Referring to FIGURES 3 to 6, inclusive, the sensing means comprises an arm 63 pivoted on an elongated rectangular or oblong mounting bracket 64 secured to the front of the screed unit 18 a substantial distance above and parallel with the spreading screw 17. Bracket 64 is provided with a lengthwise slot 65 extending the major portion of the length thereof. A rectangular mounting plate 66 seats on the back of bracket 64 and is secured in adjustment lengthwise thereof by a bolt 67 passing through slot 65 and plate 66, there being a nut 68 threaded onto the rearward end of bolt 67 and spring washers 69 and 70 being interposed between nut 68 and plate 66 and between bracket 64 and the head of bolt 67. Arm 63 is pivoted on a shouldered bolt 71 extending, like bolt 67, through slot 65 and plate 66 there being a nut 72 threaded on the rearward end of bolt 71 the forward reduced portion of which passes through arm 63. A spring washer 73 is disposed between nut 72 and plate 66 and a spring washer 74 is disposed between the forward face of arm 63 and the head of bolt 71. The bolt 71 and the associated nut and washers provide friction means for damping the tilting of arm 63 about bolt 71 sufficiently to guard against objectionable free swinging thereof while permitting tilting of arm 63, as will appear more fully presently. Further, the bolt and nut means provide for ready adjustment of arm 63 lengthwise of the spreading screw conveyor 17 for determining the width of the strip or slab of material being laid. A foot plate 75 of generally rectangular shape but having its lower end inclined downward and rearward, is secured to the forwardly projecting flange 76 of an angle bracket 77 having a flange 78 engaging the inner edge of arm 63. Arm 63 is provided at its lower portion with a lenthwise slot 79 receiving a bolt 80 passing through bracket 77 and having a nut (not shown) threaded upon its rearward end. The plate 75 is thus secured upon the lower end of arm 63 for relative vertical adjustment to extent limited by the length of slot 79. It will further be noted, from FIGURES 4 and 5, that the arm 63 is provided with a plurality of openings—two being shown—for reception of the pivot bolt 71. That provides means whereby arm 63 may be adjusted vertically which, in conjunction with the vertical adjustment of plate 75, renders it possible to determine the thickness, as well as the width, of the slab of material being laid, by means of the sensing means, as will appear more fully later.

Figure 4:
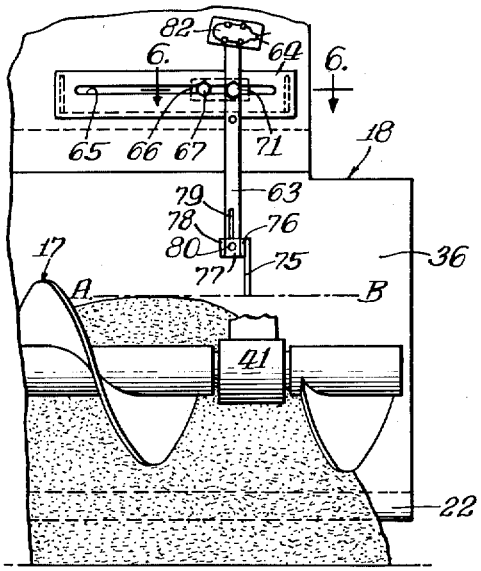
FIGURE 4 is a fragmentary sectional view, on an enlarged scale, taken substantially on line 4—4 of FIGURE 3, showing the sensing means in its normal upright position.
Figure 5:
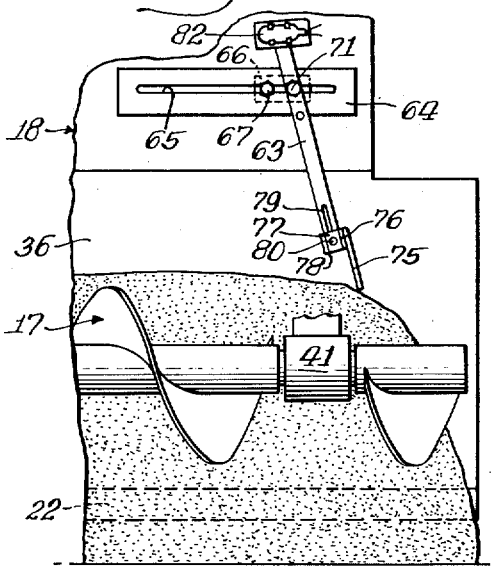
FIGURE 5 is a view similar to FIGURE 4 but showing the sensing means tilted by excess material at the adjacent end portion of the distributing screw conveyor.
Figure 6:
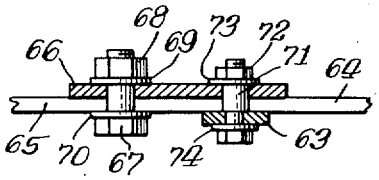
FIGURE 6 is a sectional view, on an enlarged scale, taken substantially on line 6—6 of FIGURE 4.
Figure 7:
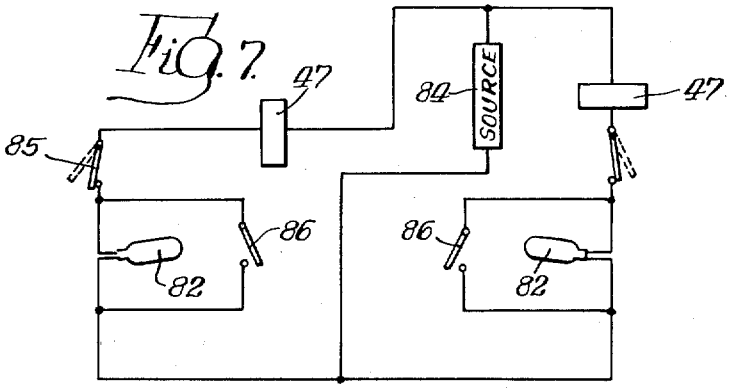
FIGURE 7 is a schematic view of the circuit diagram of the control means.

A mercury switch 82, of conventional type, is mounted on the upper end of arm 63 and in the normal vertical position thereof, shown in FIGURE 4, is inclined downward and outward. [The clutch] *Each of the clutches* 47 on countershaft 44 is an electromagnetic clutch of conventional type which, when energized, clutches the sprocket wheel 46 to shaft 44. As will be understood from what has been said, a sensing device, including the mercury switch 82, is provided adjacent each end of the distributing or spreading screw conveyor 17. An instrument panel 83 is mounted on the tractor unit 10 which may be provided with a suitable source of electrical energy, such as a generator, driven by the prime mover 15, as is known. Electrical energy for energizing the clutch 47 is taken from the generator or other suitable source on the tractor unit 10. Referring to FIGURE 7, [the] *a* clutch 47 and [the two mercury switches] *a mercury switch 82* are connected in series to the source 84 of electrical energy. A pedal switch 85, operated by the operator of the tractor unit, is interposed between one side of the source 84 and the clutch 47, and each of the mercury switches 82 is shunted by a lock-out switch 86. In the normal operation of the machine the pedal [switch] *switches* 85 [is] *are* closed and both of the lockout switches 86 are open. During the advance of the machine the surfacing or paving material is delivered by the delivery conveyor 20 to the spreading screw conveyor 17 at the central area thereof, it being understood that the sides of the hopper 11 are inclined downward and inward and the width of the conveyor 20 is substantially less than the length [or extent transversely of conveyor 20] of the spreading screw conveyor 17. The latter conveyor spreads the material toward the sides of the machine as it is received from the delivery conveyor. Under proper operating conditions, the spreading screw conveyor 17 spreads the material to the desired proper width during the advance of the machine and the mold board 36 directs the spread material downward and rearward to the plate 21 of the screed assembly 18, by which the strip or slab of proper width is compacted and finished. So long as the material is delivered at the proper rate to the spreading screw conveyor 17, the height of the material in the spreading screw conveyor is somewhat below the foot plate 75 of arm 63, as indicated by line A—B in FIGURE 4. Accordingly, when the material is delivered to the spreading screw conveyor 17 at the proper rate to maintain the desired thickness and width of the slab of material being laid, each of the arms 63 remains in its vertical position shown in FIG. 4 with the mercury switch 82 inclined downward and outward, in which position it is closed, maintaining the circuit of *the corresponding* clutch 47 closed, it being assumed that the pedal [switch 85 is in its] *switches 85 are in their* normal closed position and the lock-out switches 86 are in their normal open position, as above described. In the event the material is delivered to the spreading screw conveyor 17 at an excessive rate, it will pile up in that conveyor so as to extend above the lower edge of foot plate 75 and will exert outward pressure against that plate effective for turning arm 63 about its pivot into a position such that the associated mercury switch 82 opens, as will be clear from FIGURE 5 illustrating the condition just referred to. When that occurs, the circuit of *the corresponding* clutch 47 is opened, thus stopping drive *of the corresponding section* of the delivery conveyor and that condition obtains until sufficient of the material has been spread by the spreading screw conveyor 17 to compensate for the excess, at which time the level of the material in the conveyor 17 falls below the foot plate 75 and the arm 63 returns to its normal vertical position by gravity, thus again closing the associated mercury switch 82 and thereby reestablishing the circuit of the clutch 47. When clutch 47 is again energized it reestablishes the drive of the delivery conveyor 20 and the machine resumes its normal operation. By adjusting the foot plate 75 of the respective arms vertically, or adjusting the arms vertically, or both, the effective position of foot plate 75 relative to the spreading screw conveyor 17 may be adjusted to suit the desired depth or thickness of the slab of material being laid, it being noted in that connection that the screed assembly 18 may also be adjusted to that end, as is known. When either of the sensing devices is actuated responsive to excess material in either section of the spreading screw conveyor 17, operation of that section may be interrupted by de-clutching the corresponding sprocket wheel from the countershaft 44, until the excess material has been compensated for, after which the section of the spreading screw conveyor 17 may be again put into operation. I thus provide control means whereby the delivery conveyor is automatically disabled responsive to excess material in either section of the distributing screw conveyor 17 and is enabled when the excess of material has been compensated for, and either section of the spreading screw conveyor may be disabled and enabled selectively and independently of the other section thereof. The control means of my invention thus assures uniformity of width and depth of the slab of material being laid and is conducive to speed and accuracy in the laying of such material. The particular sensing means shown and described is by way of example only, and it will be understood that, within the broader concept of my invention, any suitable sensing means may be employed and any suitable means for enabling and disabling the delivery conveyor responsive to actuation of the sensing means may also be employed. Within the broader concept of my invention the sensing means may be signaling means responsive to which the operator of the machine disables and enables the delivery conveyor as conditions may require. Referring further to the diagram of FIGURE 7, pedal switch 85, when opened, will interrupt the circuit of *the corresponding* clutch 47 thus stopping the *corresponding section of the* delivery conveyor, which may be desirable under certain conditions. Also, closing either of the lock-out switches 86 renders the corresponding mercury switch 82 ineffective, which may also be desirable under certain conditions. Normally the sensing means functions to enable and disable the delivery conveyor, as above explained, and the operator has at all times complete control over the delivery conveyor and the sensing means through the switches 85 and 86, which is desirable for obvious reasons.

It will be understood that changes in detail may be resorted to without departing from the field and scope of my invention, and I intend to include all such variations, as fall within the scope of the appended claims, in this application in which the preferred form only of my invention has been disclosed.

I claim:

1. In a road surfacing machine, material delivery means, material distributing means disposed rearward and exterior of said delivery means and extending transversely of said machine and comprising two independently operable sections for distributing material toward the sides of said machine, said delivery means delivering material to said distributing means at the midportion thereof and said distributing means being effective for distributing the material toward the sides of the machine at a rate normally effective for maintaining the material at a substantially uniform predetermined depth on the roadway, means for optionally driving and stopping said sections independently of each other, control members exterior of said delivery means movably mounted adjacent the outer ends of said distributing means and disposed to clear the material therein when it is at said predetermined depth, said members having a normal position and being movable therefrom by material above said predetermined depth moved outward by said distributing means, control switches actuated by said members, said switches being closed in said normal position of said members and being opened responsive to movement of said members from said normal position respectively, means for driving said delivery means comprising a normally engaged magnetic clutch connected in series with said control switches, a normally closed switch in series with said clutch and control switches operable for optionally stopping said delivery means independently of said control switches, and lock-out switches shunting said control switches respectively for optionally and selectively disabling either thereof.

2. In a road surfacing machine, delivery means for delivering onto a roadway a surfacing mix during travel of said machine along the roadway, distributing means exterior of said delivery means spaced rearward therefrom and comprising two independently operable sections effective for distributing the mix towards the sides of the machine at a rate normally effective for maintaining the mix at a substantially uniform predetermined depth on the roadway, control members exterior of said delivery means movably mounted adjacent the outer ends of said distributing means and disposed to clear the mix therein when it is at said predetermined depth and to be contacted by the mix above said predetermined depth, said members having a normal position and being movable therefrom by mix above said predetermined depth moved outward by said distributing means, and supplementary control means actuated by said members effective in the normal position thereof for activating said delivery means and effective for deactivating said delivery means responsive to movement of said members from normal position.

3. In a road surfacing machine, delivery means for delivering onto a roadway a surfacing mix during travel of said machine along the roadway, distributing means exterior of said delivery means spaced rearward therefrom and comprising two independently operable sections effective for distributing the mix towards the sides of the machine at a rate normally effective for maintaining the mix at a substantially uniform predetermined depth on the roadway, control members exterior of said delivery means movably mounted adjacent the outer ends of said distributing means and disposed to clear the mix therein when it is at said predetermined depth and to be contacted by the mix above said predetermined depth, said members having a normal position and being movable therefrom by mix above said predetermined depth moved outward by said distributing means, supplementary control means actuated by said members effective in the normal position thereof for activating said delivery means and effective for de-activating said delivery means responsive to movement of said members from normal position, and means for optionally and selectively enabling and disabling said distributing means sections independently of said supplementary control means.

4. In a road surfacing machine, delivery means for delivering onto a roadway a surfacing mix during travel of said machine along the roadway, distributing means exterior of said delivery means spaced rearward therefrom and comprising two independently operable sections effecitve for distributing the mix towards the sides of the machine at a rate normally effective for maintaining the mix at a substantially uniform predetermined depth on the roadway, an arm adjacent the outer end of each section pivoted on an axis substantially parallel with the direction of travel of said machine and above said sections, said arm having a normal substantially vertical position and extending downward with its lower end disposed to clear mix in said distributing means at said predetermined depth and to be contacted by mix above said predetermined depth moved outward by said distributing means effective for tilting said arm from said normal position, and control means carried by said arm effective for activating and deactivating said delivery means responsive to movement of said arm to and from normal position.

5. In a road surfacing machine, delivery means for delivering onto a roadway a surfacing mix during travel of the machine along the roadway, a screed assembly spaced rearward from said delivery means and having a bottom screed plate, a mold board in front of said screed assembly inclined downward and rearward for directing the mix to said screed plate, distributing means between said delivery means and mold board comprising two independently operable sections effective for distributing the mix toward the sides of said machine at a rate normally effective for maintaining the mix at a substantially uniform predetermined depth on the roadway, said distributing means in part underlying the upper portion of said mold board, an arm pivoted intermediate its ends on said mold board adjacent each end of said distributing means and on an axis above said distributing means and substantially parallel with the direction of travel of said machine, said arm normally being disposed substantially vertically with its lower end at a height to clear mix at said predetermined depth on said roadway in said distributing means and to be contacted by mix above said predetermined depth being moved outward by said distributing means effective for tilting said arm from its said normal position, and control means carried by said arm effective for activating and deactivating said delivery means responsive to movement of said arm to and from normal position.

6. In a road surfacing machine, delivery means for delivering onto a roadway a surfacing mix during travel of the machine along the roadway, a screed assembly spaced rearward from said delivery means and having a bottom screed plate, a mold board in front of said screed assembly inclined downward and rearward for directing the mix to said screed plate, distributing means between said delivery means and mold board comprising two independently operable sections effective for distributing the mix toward the sides of said machine at a rate normally effective for maintaining the mix at a substantially uniform predetermined depth on the roadway, said distributing means in part underlying the upper portion of said mold board, an arm pivoted intermediate its ends on said mold board adjacent each end of said distributing means and on an axis above said distributing means and substantially parallel with the direction of travel of said machine, said arm normally being disposed substantially vertically with its lower end at a height to clear mix at said predetermined depth on said roadway in said distributing means and to be contacted by mix above said predetermined depth being moved outward by said distributing means effective for tilting said arm from its said normal position, control means carried by said arm effective for activating and deactivating said delivery means responsive to movement of said arm to and from normal position, and means for optionally and selectively enabling and disabling said distributing means sections independently of said control means.

References Cited in the file of this patent or the original patent

UNITED STATES PATENTS

| | | |
|---|---|---|
| 1,304,553 | Gadd | May 27, 1919 |
| 1,489,938 | Hale | Apr. 8, 1924 |
| 1,891,319 | Stayton | Dec. 20, 1932 |
| 2,376,304 | Anderson | May 15, 1945 |
| 2,393,954 | Baker | Feb. 5, 1946 |
| 2,406,886 | McBean | Sept. 3, 1946 |
| 2,408,221 | Michel | Sept. 24, 1946 |
| 2,426,347 | Fulton | Aug. 26, 1947 |
| 2,494,819 | Lane | Jan. 17, 1950 |
| 2,597,221 | Barber | May 20, 1952 |
| 2,785,791 | Cordis | Mar. 19, 1957 |
| 2,792,923 | Fraubose et al. | May 21, 1957 |